June 10, 1930. F. M. MEHL 1,763,473
HAND OPERATED WHEEL RAKE
Filed Oct. 20, 1928   2 Sheets-Sheet 2
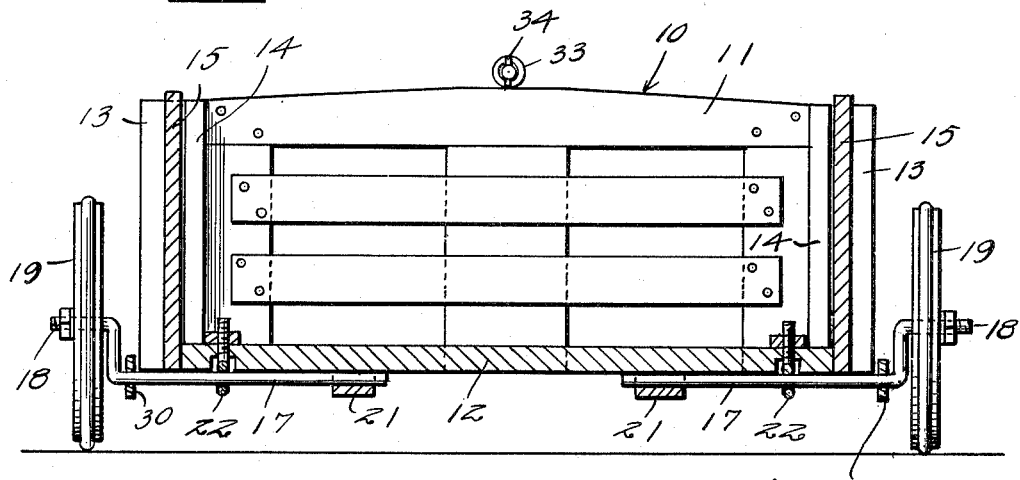
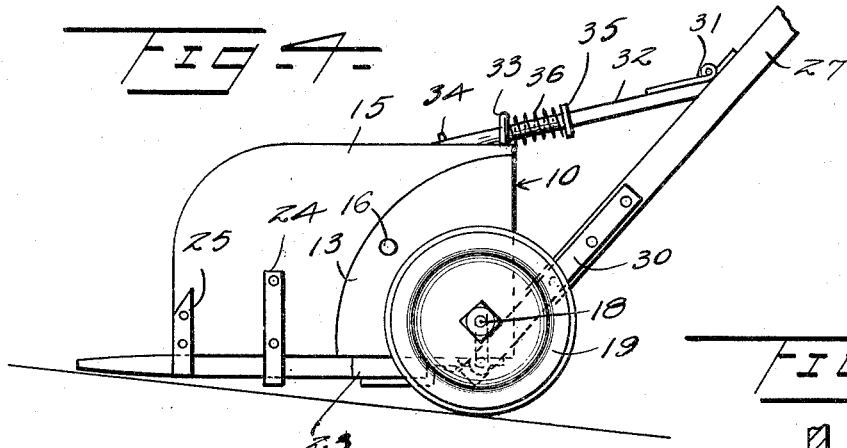
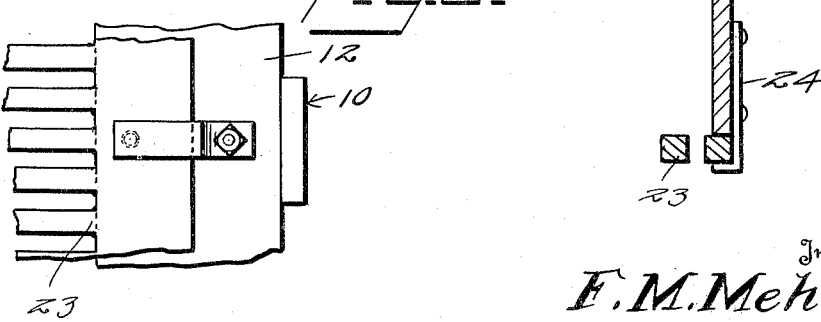
Inventor
F. M. Mehl
By Watson E. Coleman
Attorney Patented June 10, 1930

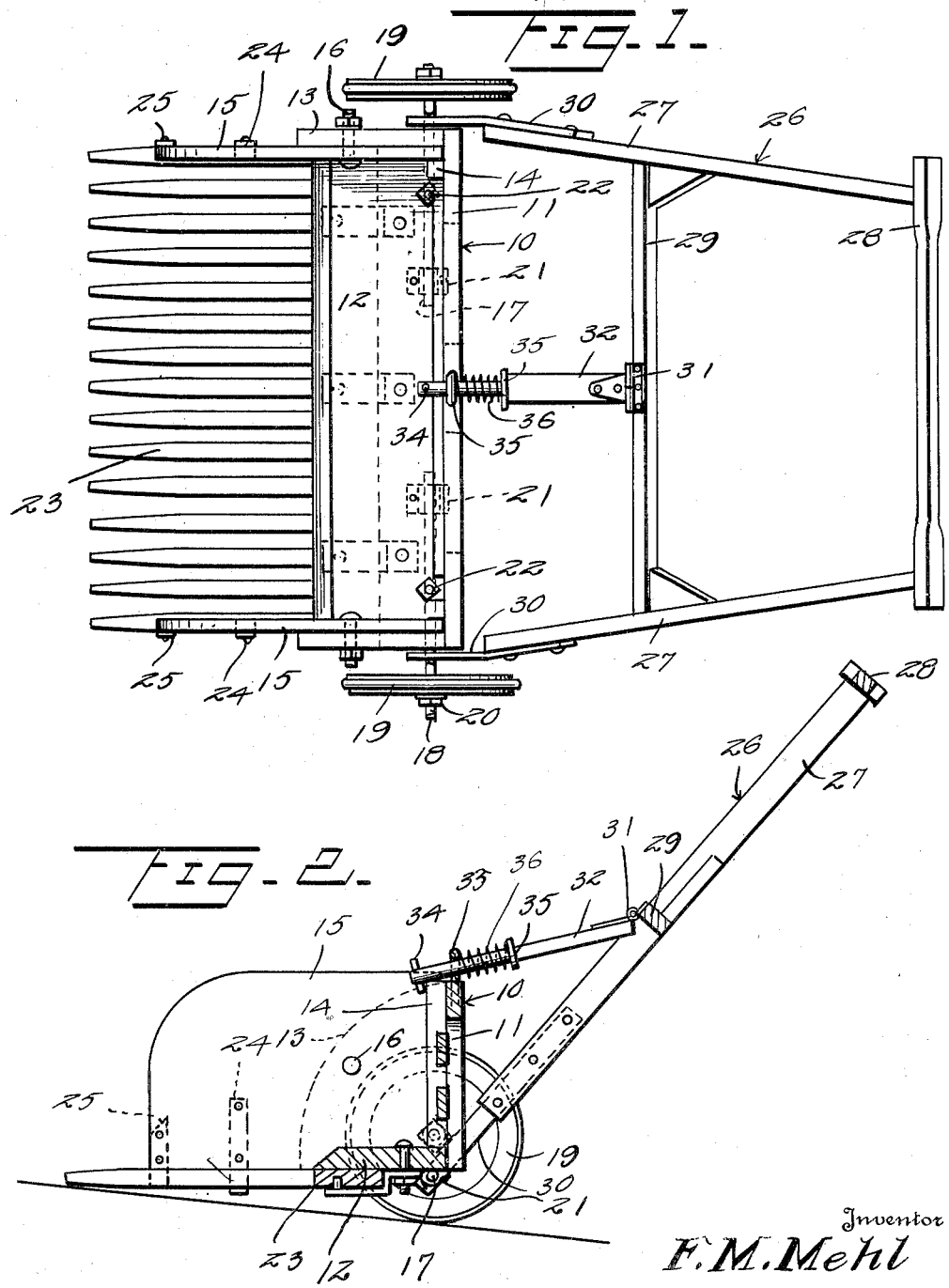

1,763,473

UNITED STATES PATENT OFFICE

FREDERIC M. MEHL, OF FREMONT, NEBRASKA

HAND-OPERATED WHEEL RAKE

Application filed October 20, 1928. Serial No. 313,824.

This invention relates to hand operated wheel rakes and more particularly to a device for use on lawns and in gardens collecting trash, grass and other débris which may be readily manipulated by the operator, which may be cheaply manufactured and which will be durable and efficient in service.

An important object of the invention is to provide a construction such that the teeth of the rake will be at all times, during operation, maintained in engagement with the ground with a yielding pressure of such character that the teeth will not tend to enter the ground and will, at the same time, be maintained in contact therewith.

A further object of the invention is to provide a structure of this character, wherein the rake teeth of the rake may be readily interchanged to permit use of different types of teeth with the rake and in which the entire structure is so formed that it may be readily adjusted, assembled and disassembled and transformed for use with different types of débris.

These and other objects I attain by the construction shown in the accompanying drawings, wherein for the purpose of illustration is shown a preferred embodiment of my invention and wherein:—

Figure 1 is a plan view of a wheel rake constructed in accordance with my invention;

Figure 2 is a vertical longitudinal sectional view therethrough;

Figure 3 is a transverse vertical sectional view therethrough;

Figure 4 is a side elevation thereof;

Figure 5 is a fragmentary bottom plan view showing the method of attaching the tooth bar;

Figure 6 is a fragmentary sectional view showing the supporting ring provided by the auxiliary end members for the tooth bar.

Referring now more particularly to the drawings, the numeral 10 generally designates a main frame including a rear wall 11 and a bottom wall 12 which, at their ends, are connected by end walls 13. The rear wall has guide strips 14 coacting with the end walls to produce a groove for the reception of the rear ends of extension end walls 15, which are removably bolted, as at 16, to the ends 13. Axles 17 are provided, comprising shafts having at their outer ends offset cranks 18 for the reception of supporting wheels 19, which are retained in position by nuts 20 or any other suitable expedient. The axles 17, beneath the bottom of the main frame, are engaged in bearings 21 adjacent their inner ends and near their outer ends are passed through eye bolts 22, which extend through the bottom wall of the frame and which may be drawn upwardly to clamp the axle in desired adjusted position of the crank 18, so that the height of the main frame from the ground may be readily adjusted. The forward end of the bottom wall of the main frame has cleated thereto a tooth bar 23 which is removable to permit the use of a tooth bar of different character and the extension side walls 14 are provided with hook supports 24 adapted to engage beneath end teeth of the bar and support the same.

The forward ends of the side walls are preferably provided with a rubbing or protector strip 25.

The numeral 26 designates a handle structure including side members 27 connected at their outer ends by a hand grip bar 28 and adjacent their inner ends by a transversely extending brace 29. The ends of the side bars 27 are each provided with an extension 30 apertured for the passage of the associated axle upon which they pivot. Hinged to the brace 29 centrally thereof, as at 31, and projecting forwardly therefrom is a thrust bar 32 which, at its forward end, passes through an eye 33 carried by the upper edge of the rear wall of the main frame at the center thereof. Forwardly of this eye, the thrust bar has a stop 34 for engagement with the eye and rearwardly of the eye in spaced relation thereto, it is provided with a spring seat 35 against which abuts one end of a spring 36, the opposite end of which abuts the eye, said spring surrounding the thrust bar. It will be obvious that as the hand grip 28 is raised or lowered, due to the fact that the side members 26 are pivoted at a point below the eye, the cross bar or brace 29 will tend to approach or recede from the eye, with the result that the tension exerted by the spring 36 against the eye is increased or diminished, thus permitting a regulation of the tension with which the teeth of the rake engage the ground. It will also be obvious that with persons of different height, the most comfortable position at which the hand bar will be disposed is the position in which it will naturally be maintained, with the result that by the combination of the adjustable axles and the variation of spring tension, the rake may be disposed so that the proper tension may be exerted without regard to what this normal level may be.

When lowered a predetermined distance below the normal level, the stop 34 will engage against the eye, drawing the rear wall rearwardly and downwardly and thereby elevating the edges of the teeth, so that the rake may be transported from place to place without operation thereof as, for example, when moving it to the place where it is to be employed or returning therefrom with a load. When heavy débris is to be moved, the extension end members 15 may be removed and a greater surface for the reception of the débris thereby provided. Any suitable material may be employed in the construction of the rake.

Since the construction employed is capable of a certain range of change and modification without materially departing from the spirit of the invention, I do not limit myself to such specific structure except as hereinafter claimed.

I claim:—

1. In a hand operated wheel rake, a main frame including bottom and rear walls, vertically adjustable wheels supporting said frame, a tooth bar secured to the frame, a handle pivoted to the frame at the lower end thereof, a guide carried by the upper end of the rear wall and a member hingedly connected to said handle and extending through said guide having a stop in spaced relation to the guide and a spring extending between said stop and the guide and constantly urging the rear wall of the frame forwardly to thereby maintain the teeth of said bar in engagement with the ground.

2. In a hand operated wheel rake, a main frame including bottom and rear walls, vertically adjustable wheels supporting said frame, a tooth bar secured to the frame, a handle pivoted to the frame at the lower end thereof, a guide carried by the upper end of the rear wall, and a member hingedly connected to said handle and extending through said guide having a stop in spaced relation to the guide, and a spring extending between said stop and the guide and constantly urging the rear wall of the frame forwardly to thereby maintain the teeth of said bar in engagement with the ground, said member including a second stop disposed at the opposite side of the guide from the first named stop and adapted to engage the guide upon depression of the handle to move the frame rearwardly and shift said teeth out of engagement with the ground.

3. In a hand operated wheel rake, a main frame including bottom and rear walls, vertically adjustable wheels supporting said frame, a tooth bar secured to the frame, a handle pivoted to the frame at the lower end thereof, a guide carried by the upper end of the rear wall and a member hingedly connected to said handle and extending through said guide having a stop in spaced relation to the guide, and a spring extending between said stop and the guide and constantly urging the rear wall of the frame forwardly to thereby maintain the teeth of said bar in engagement with the ground, there being a brace connecting elements of said handle, said member comprising a bar pivoted to the brace centrally thereof.

4. In a hand operated wheel rake, a main frame including bottom and rear walls, vertically adjustable wheels supporting said frame, a tooth bar secured to the frame, a handle pivoted to the frame at the lower end thereof, a guide carried by the upper end of the rear wall and a member hingedly connected to said handle and extending through said guide having a stop in spaced relation to the guide, and a spring extending between said stop and the guide and constantly urging the rear wall of the frame forwardly to thereby maintain the teeth of said bar in engagement with the ground, there being a brace connecting elements of said handle, said member comprising a bar pivoted to the brace centrally thereof, the means for adjusting the rear wheels comprising pivoted crank axles therefor and means for securing said axles in adjusted positions, the pivot of the handle comprising said axles.

5. In a hand operated wheel rake, a main frame including bottom and rear walls, vertically adjustable wheels supporting said frame, a tooth bar secured to the frame, a handle pivoted to the frame at the lower end thereof, a guide carried by the upper end of the rear wall, and a member hingedly connected to said handle and extending through said guide having a stop in spaced relation to the guide, and a spring extending between said stop and the guide and constantly urging the rear wall of the frame forwardly to thereby maintain the teeth of said bar in engagement with the ground, said member including a second stop disposed at the opposite side of the guide from the first named stop and adapted to engage the guide upon depression of the handle to move the frame rearwardly and shift said teeth out of engagement with the ground, there being a brace connecting said elements of the handle, said member comprising a bar pivoted to the brace centrally thereof.

6. In a hand operated wheel rake, a main frame including bottom and rear walls, vertically adjustable wheels supporting said frame, a tooth bar secured to the frame, a handle pivoted to the frame at the lower end thereof, a guide carried by the upper end of the rear wall and a member hingedly connected to said handle and extending through said guide having a stop in spaced relation to the guide, and a spring extending between said stop and the guide and constantly urging the rear wall of the frame forwardly to thereby maintain the teeth of said bar in engagement with the ground, the means for adjusting the rear wheels comprising pivoted crank axles therefor, and means for securing said axles in adjusted positions, the pivot of the handle comprising said axles.

7. In a hand operated wheel rake, a main frame including bottom and rear walls, vertically adjustable wheels supporting said frame, a tooth bar secured to the frame, a handle pivoted to the frame at the lower end thereof, a guide carried by the upper end of the rear wall, and a member hingedly connected to said handle and extending through said guide having a stop in spaced relation to the guide, and a spring extending between said stop and the guide and constantly urging the rear wall of the frame forwardly to thereby maintain the teeth of said bar in engagement with the ground, said member including a second stop disposed at the opposite side of the guide from the first named stop and adapted to engage the guide upon depression of the handle to move the frame rearwardly and shift said teeth out of engagement with the ground, the means for adjusting the rear wheels comprising pivoted crank axles therefor and means for securing said axles in adjusted positions, the pivot of the handle comprising said axles.

8. In a hand operated wheel rake, a main frame including bottom and rear walls, vertically adjustable wheels supporting said frame, a tooth bar secured to the frame, a handle pivoted to the frame at the lower end thereof, a guide carried by the upper end of the rear wall and a member hingedly connected to said handle and extending through said guide having a stop in spaced relation to the guide, and a spring extending between said stop and the guide and constantly urging the rear wall of the frame forwardly to thereby maintain the teeth of said bar in engagement with the ground, there being a brace connecting elements of said handle, said member comprising a bar pivoted to the brace centrally thereof, the means for adjusting the rear wheels comprising pivoted crank axles therefor and means for securing said axles in adjusted positions, the pivot of the handle comprising said axles, the means for adjusting the rear wheels comprising pivoted crank axles therefor and means for securing said axles in adjusted positions, the pivot of the handle comprising said axles.

In testimony whereof I hereunto affix my signature.

FREDERIC M. MEHL.